(12) United States Patent
Bhasin et al.

(10) Patent No.: US 7,024,177 B2
(45) Date of Patent: Apr. 4, 2006

(54) METHOD AND APPARATUS FOR AUTHENTICATING USERS OF MOBILE DEVICES

(75) Inventors: Aditya Bhasin, Santa Clara, CA (US); Michael Edward Smith Luna, Carnation, WA (US); Suresh Babu Bashyam, Sunnyvale, CA (US)

(73) Assignee: Openwave Systems Inc., Redwood City, CA (US)

( * ) Notice: Subject to any disclaimer, the term of this patent is extended or adjusted under 35 U.S.C. 154(b) by 411 days.

(21) Appl. No.: 10/205,767

(22) Filed: Jul. 25, 2002

(65) Prior Publication Data
US 2003/0186680 A1 Oct. 2, 2003

Related U.S. Application Data

(60) Provisional application No. 60/364,949, filed on Mar. 14, 2002.

(51) Int. Cl.
*H04M 1/66* (2006.01)
(52) U.S. Cl. ............... 455/411; 455/412.1; 455/414.1; 370/338; 370/401
(58) Field of Classification Search ............... 455/466, 455/412, 414; 709/223, 238; 370/338, 401, 370/352
See application file for complete search history.

(56) References Cited

U.S. PATENT DOCUMENTS

| 2002/0015403 A1 | 2/2002 | McConnell et al. |
| 2002/0026525 A1* | 2/2002 | Armitage .................... 709/238 |
| 2002/0098855 A1* | 7/2002 | Hartmaier et al. .......... 455/466 |
| 2003/0172145 A1* | 9/2003 | Nguyen ...................... 709/223 |

FOREIGN PATENT DOCUMENTS

| FI | 20001990 | 3/2002 |
| JP | 10/177552 | 6/1998 |
| WO | WO 01/67716 A1 | 9/2001 |

* cited by examiner

*Primary Examiner*—Sonny Trinh
*Assistant Examiner*—Phuoc Doan
(74) *Attorney, Agent, or Firm*—Blakely, Sokoloff, Taylor & Zafman LLP

(57) ABSTRACT

In one embodiment, a method for authenticating a user of a mobile device is provided. The method comprises receiving a request from a client device to access a resource on a network; identifying a network address of the client device; retrieving a mapping of the network address to user identification information and device identification information; determining if the mapping is valid; preventing the request from reaching the resource if the mapping is not valid.

19 Claims, 4 Drawing Sheets

METHOD AND APPARATUS FOR AUTHENTICATING USERS OF MOBILE DEVICES

CLAIM OF PRIORITY

The present application hereby claims the benefit of the filing date of a related Provisional Application filed on Mar. 14, 2002, and assigned Application Ser. No. 60/364,949, which is incorporated herein by reference.

FIELD OF THE INVENTION

This invention relates to a method and apparatus for authenticating users of mobile devices.

BACKGROUND

When a user logs in with a mobile device to a wireless network controlled by a Communications Service Provider (CSP), a network Home Agent (HA) or some other entity, depending on the network, such as a Network Access Server (NAS), authenticates the user. The user is assigned an Internet protocol (IP) address which is valid for the duration of the mobile IP session. Thereafter, the HA sends an accounting message to a server configured to perform accounting services in relation to the mobile IP session. Such accounting services include tracking the consumption of resources so as to provide information for management, planning, billing, or other purposes. Typically, the accounting message is sent as a Uniform Datagram Packet (UDP) and contains the mobile IP address, user and device identification information. A common protocol used to send the accounting message is the Remote Authentication Dial In User Service (RADIUS) protocol. The information contained in the accounting message is stored as a mapping within the server (thereinafter referred to as the mapping server). When other entities, such as a gateway or proxy server which bridges communications between the wireless network controlled by the HA and a remote network, for example the Internet, receive a request from the mobile device, a mobile IP address contained in the request is used as a key to request device and user identification information mapped to the mobile IP address from the mapping server. When the user logs out, or the mobile session is terminated for any other reason, the HA sends a stop accounting message to the mapping server requesting the mapping server to remove the mapping associated with the mobile IP address.

As mentioned above, the accounting messages are UDP messages. The UDP protocol is inherently unreliable since no acknowledgement is required for each data packet that is sent and there is no checking and correction mechanism to deal with losses of data packets. Typically, the HA sends out the stop accounting message to the mapping server and waits for a predetermined amount of time for an acknowledgement message from the mapping server. If no acknowledgement message is received, the HA may be configured to resend the stop accounting message. However, the resent stop accounting message is also not guaranteed to be received. Further, the HA is configured to resend the message for a limited number of times after which it simply gives up.

Thus, it is possible that the stop accounting message may not reach the mapping server. As a result, an invalid mapping of mobile IP address to the device identification information and to user identification information may continue to exist in the mapping server, even after the user has terminated the session and the HA has allocated the mobile IP address to another user. Should this happen, and the mobile device which has been allocated the same mobile IP address makes a request to the proxy or gateway server, the proxy or gateway server will be able to obtain the user and device identification that was previously mapped to information associated with the mobile IP address in order to authenticate the request. Thus, the current user will have the permissions of the previous user and will be able to access or modify data belonging to the previous user, which compromises network security.

SUMMARY OF THE INVENTION

The invention provides a method and apparatus for authenticating users of mobile devices. In one embodiment, a proxy or gateway server bridging communications between a wireless network and a wired network receives a request from a client device to access a network resource on the wired network. The proxy or gateway server identifies the network address of the client device and uses it to retrieve a mapping of the network address to user and device identification information stored in a mapping server. Thereafter, the proxy or gateway server determines if the mapping is valid and allows the request to reach the network resource only if the mapping is valid.

DETAILED DESCRIPTION

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Figure 1:
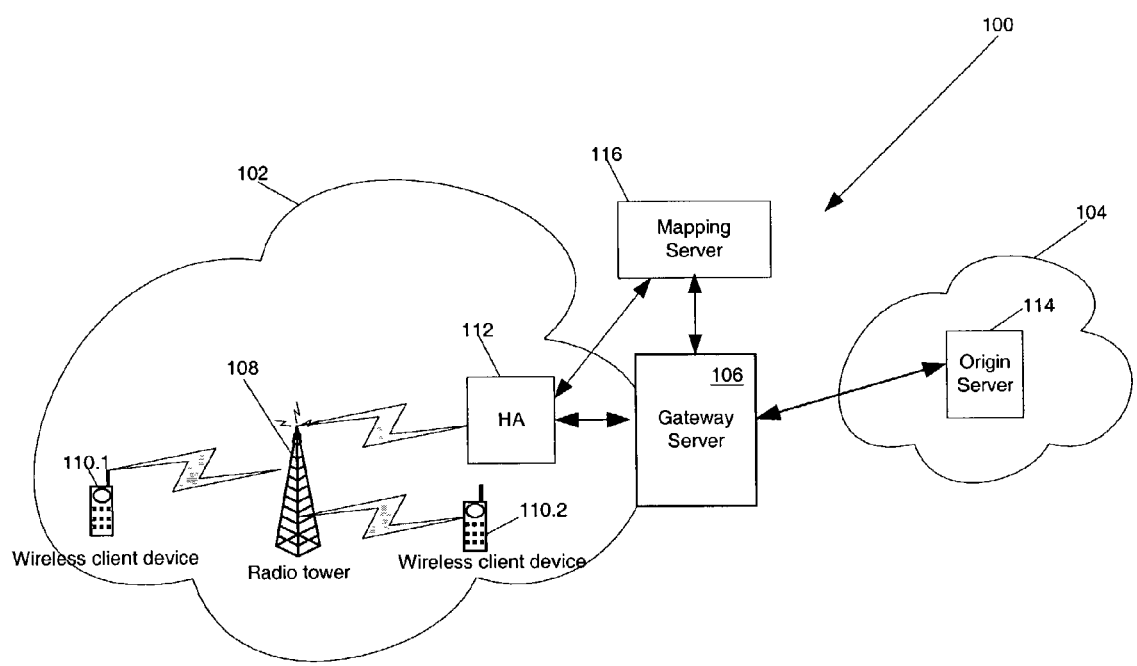
FIG. 1 shows a configuration of a network environment within which embodiments of the present invention may be practiced.

Referring now to FIG. 1 of the drawings, reference numeral 100 generally indicates a network environment within which embodiments of the present invention may be practiced. The network environment 100 comprises a wireless network 102 which is connected to a wired network 104 by a proxy or gateway server 106.

The wireless network 102 may, for example, be a network such as a Mobile Digital Packet Data (MDPD) network, a Global System for Mobile (GSM), a Code Division Multiple Access (CDMA) network, or a Time Division Multiple Access (TDMA) network. The communications protocol used by the wireless network 102 may include, for example, Wireless Application Protocol (WAP) and/or Handheld Device Protocol (HDTP). Components of the wireless network 102 include base stations 108 (only one of which is shown in FIG. 1 of the drawings), each of which facilitates wireless communications within its respective cell. Within each cell, wireless client devices may be operative and FIG. 1 of the drawings shows mobile telephones 110.1 and 110.2 being representative of such wireless client devices. Wired network 104 may be or may include the Internet, an intranet, or a data network such as a Local Area Network (LAN). Wired network 104 includes a network resource in the form of an origin server 114, which may be a World Wide Web server in one embodiment. The communications protocol supporting wireless network 104 may be, for example, Transmission Control Protocol (TCP/IP), Hypertext Transfer Protocol (HTTP), or Secure HTTP (sHTTP).

The gateway server 106 bridges communications between the wired network 104 and the wireless network 102. In order to perform its operations, gateway server 106 communicates with a home agent 112, a mapping server 116, and a cache server 118, as will be explained in greater detail below.

Figure 2:
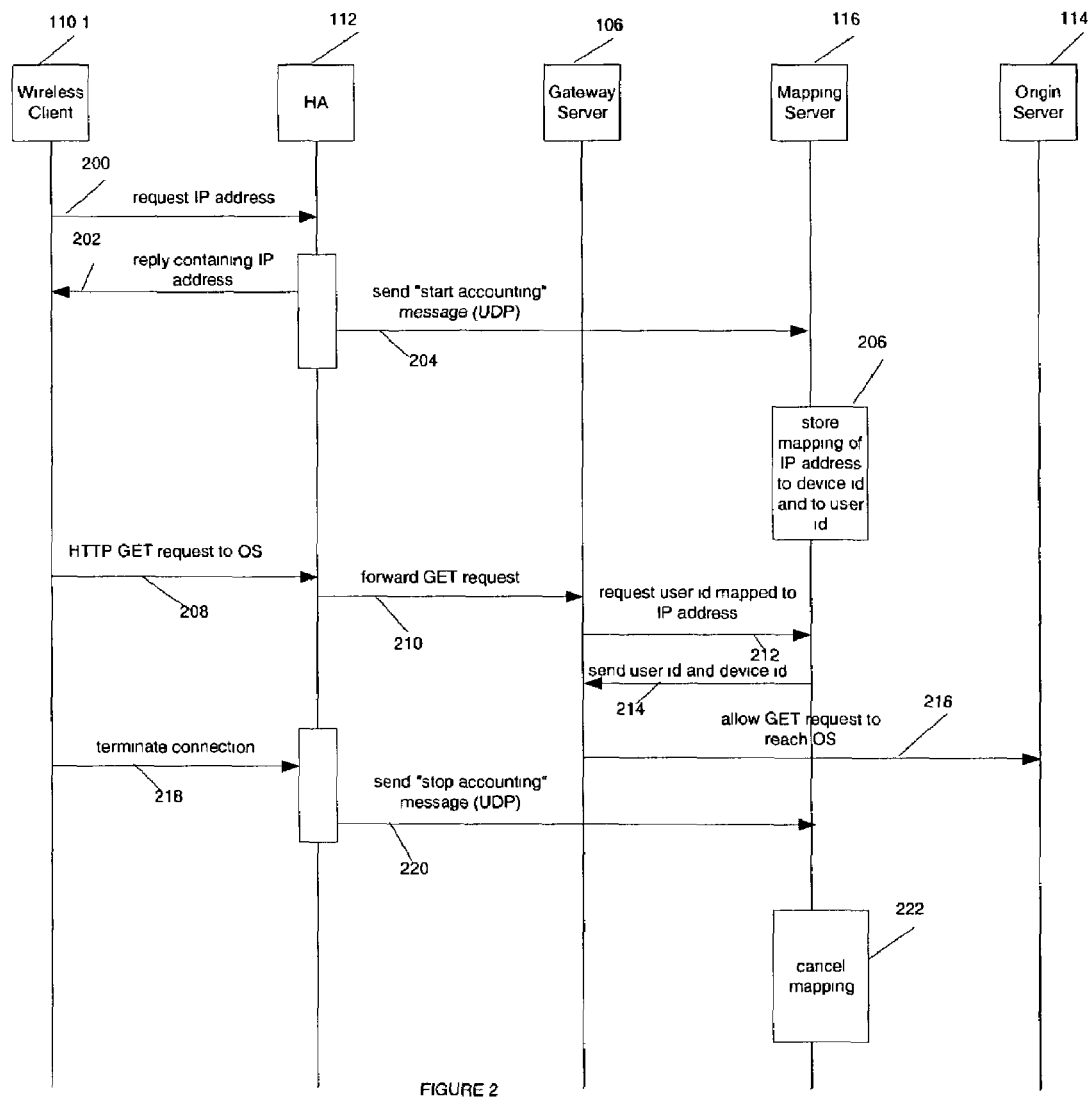
FIG. 2 shows a sequence of communications demonstrating how the unreliability of the UDP protocol can create an authentication problem.

Referring now to FIG. 2 of the drawings, a typical communications session between components of the network environment 100 which occurs when authenticating a user request from a wireless client device 110.1 is shown. In FIG. 2, the chronological sequence progresses from top to bottom. At 200, wireless client device 110.1 sends a login request to home agent 112. Home agent 112 responds by verifying the user's identification and password information contained in the request against corresponding stored information and if there is a match, home agent 112 will allocate a network address which in one embodiment is a mobile IP address to the wireless client device 110.1. At 202, home agent 112 sends a reply to wireless client device 110.1 containing the mobile IP address that was assigned to the wireless client device 110.1. At 202 home agent 112 sends a "start accounting message" to mapping server 116. The start accounting message is sent in the UDP protocol and contains a mapping of mobile the IP address to the user identification information (user ID) and to device identification information (device ID) associated with the request. In response to receiving the start accounting message, mapping server 116 stores or caches the mapping of the mobile IP address-to-device ID-to-user ID, at 206. Thereafter, at 208, wireless client device 110.1 sends a request to home agent 112 to access origin server 114. The request 208 may a Hypertext Transfer Protocol (HTTP) GET request for information stored in origin server 114. In response, home agent 112 forwards the GET request to gateway server 106, at 210. Gateway server 106 responds at 212 by sending a request to mapping server 116 for the user ID and device ID that has been mapped to the mobile IP address contained in the GET request.

At 214, mapping server 116 responds by sending the user ID and the device ID that has been mapped to the IP address to gateway server 106. At 216, gateway server 106 allows the GET request to reach origin server 114.

If mapping server 116 does not send the user and device ID to gateway server 106 at 214 which could be, for example, because there is no mapping corresponding to the IP address that was sent to mapping server 116 at 212, then gateway server 106 would not allow the HTTP GET request to reach the origin server 114. Assuming that at 218, wireless client device 110.1 sends a request to home agent 112 to terminate the current session, then at 220 home agent 112 will send a stop accounting message to mapping server 116 to cancel the mapping of the mobile IP address to the device ID and to the user ID. At 222, mapping server 116 responds by canceling the mapping.

One problem with the authentication method illustrated in FIG. 2 of the drawings occurs as follows. Suppose that the stop accounting message 220 never reaches mapping server 116 because of the inherent unreliability of the UDP protocol. If this happens it will be appreciated that as far as mapping server 116 is concerned the mobile IP address is still mapped to the user and device IDs associated with wireless client device 110.1. However, as far as home agent 112 is concerned the mobile IP address that has been assigned to wireless client device 110.1 is now available for subsequent assignment to any other wireless client device. Thus, if wireless client device 110.2 subsequently logs into wireless network 102, home agent 112 may allocate the same mobile IP address that was previously allocated to wireless client device 110.1 to wireless client device 110.2. Assuming that wireless client device 110.2 thereafter makes a request to gateway server 106 to access a network resource on origin server 114, gateway server 106 will perform step 212 in which a request is made to mapping server 116 for the user and device ID mapped to the mobile IP address supplied in the request by wireless client device 110.2. In response, at 214 mapping server 116 will supply the user and identification information associated with wireless client device 110.1. Thus, it will be seen that wireless client device 110.2 will have the permissions of wireless client device 110.1, which is undesirable for security reasons.

Figure 3:
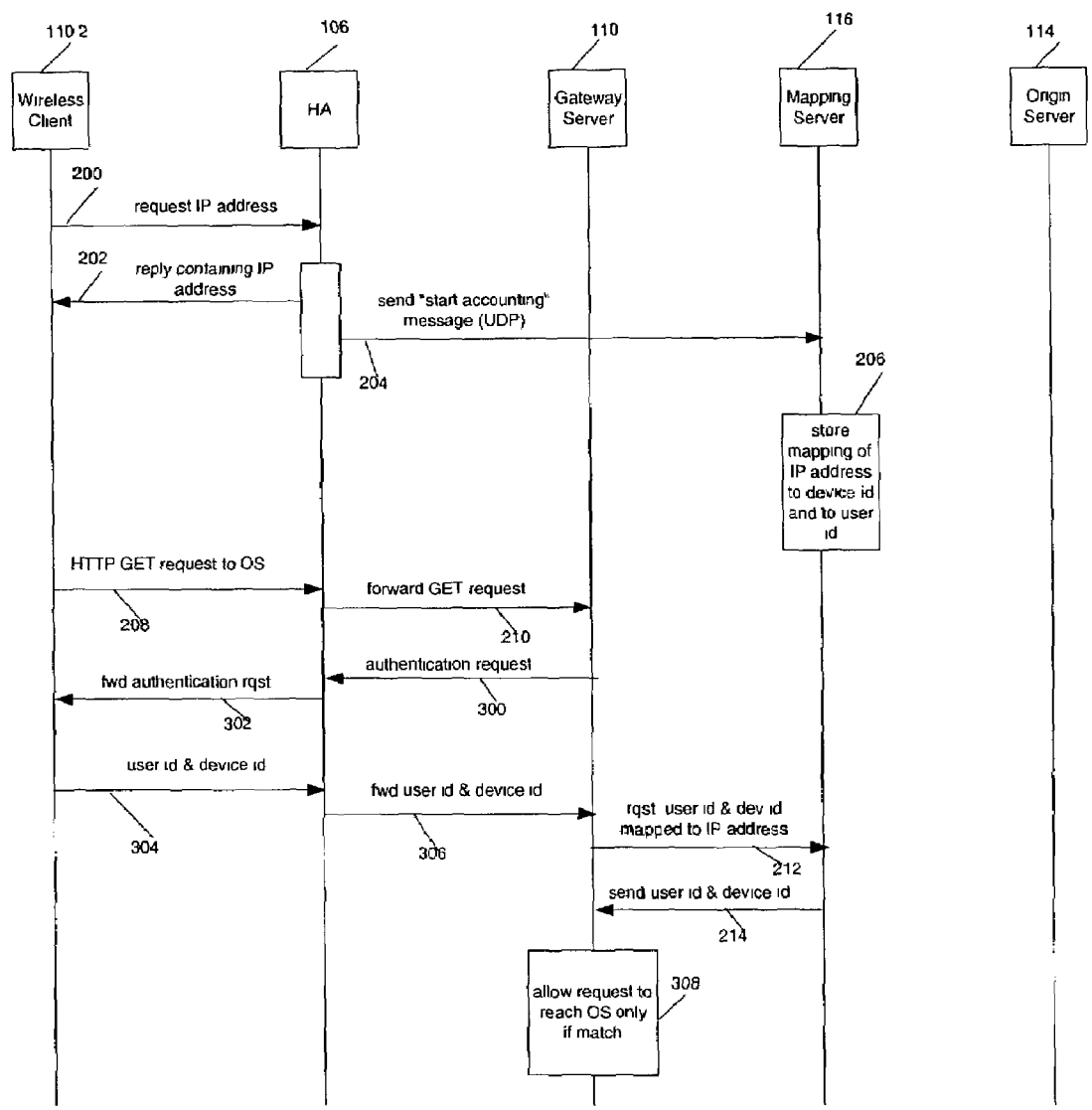
FIG. 3 illustrates an authentication method in accordance with one embodiment of the invention.

Referring now to FIG. 3 of the drawings, operations performed in authenticating a user of the mobile device in accordance with one embodiment of the invention are illustrated. Like reference numerals have been used to indicate operations which are similar to operations shown in FIG. 2 of the drawings. Note that request 200 is made by wireless client device 110.2. One difference of the method illustrated in FIG. 3 of the drawings is that gateway server 106 is configured to always "throw" (generate) an authentication challenge 300 which is forwarded to wireless client device 110.2 by home agent 112 at 302. In response to the authentication challenge, wireless client device 110.2 resends the HTTP GET request at 304 which has been enhanced with the necessary authentication information including device and user ID. At 306, the enhanced HTTP request is forwarded by home agent 112 to gateway server 106. As before, the gateway server 106 requests the user ID and device ID associated with the IP address from the mapping server 116 at 212. The IP address is obtained from the Transmission Control Protocol (TCP) data packet sent from wireless client device 110.2. At 214, the user and device IDs mapped to the mobile IP address are sent by mapping server 116 to gateway server 106. Thereafter, at 308 gateway server 106 compares the device ID and user ID obtained from the mapping server 116 with the device ID and user ID obtained from wireless client device 110.2. Only if there is a full match will gateway server 106 allow the request to reach origin server 114. Viewed in a different way, gateway server 106 prevents the request from reaching server 114 if the mapping is invalid, a condition indicated by a mismatch at block 308. For the purposes of this specification "allowing" a request to reach origin server 114 if a mapping is valid is to be regarded as being the same as "preventing" a request from reaching origin server 114 if a mapping is invalid.

Figure 4:
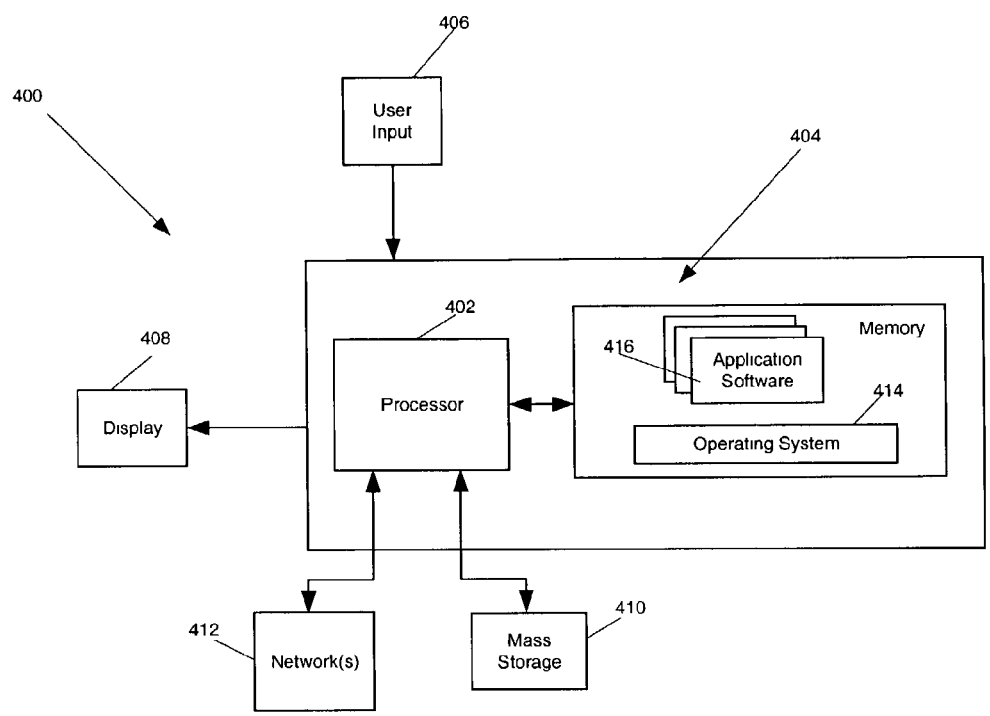
FIG. 4 is a high-level block diagram of a processing system representing one or more of the elements shown in FIG. 1.

Referring now to FIG. 4 of the drawings, reference numeral 400 generally indicates an example of processing system that may represent any of components 106, 112, 114, 116 and 118 in network environment 100.

Processing system 400 typically includes at least one processor 402 coupled to a memory 404. Processor 402 may represent one or more processors (e.g. microprocessors), and memory 404 may represent random access memory (RAM) devices comprising a main storage of system 400, as well as any supplemental levels of memory e.g., cache memories, non-volatile or back-up memories (e.g. programmable or flash memories), read-only memories, etc. In addition, memory 404 may be considered to include memory storage physically located elsewhere in system 400, e.g. any cache memory in a processor 402, as well as any storage capacity used as a virtual memory, e.g., as stored on a mass storage device 410 or on another computer coupled to system 400 via network 412.

Processing system 400 also typically receives a number of inputs and outputs for communicating information externally. For interface with a user or operator, system 400 typically includes one or more user input devices 406 (e.g., a keyboard, a mouse, etc.) and a display 408 (e.g., a CRT monitor, a LCD panel). However, with some implementations of system 400, such as in a server, direct local) user input and output may not be required, such that user input devices 406 and display 408 may be omitted.

For additional storage, system 400 may also include one or more mass storage devices 410, e.g., a floppy or other removable disk drive, a hard disk drive, a Direct Access Storage Device (DASD), an optical drive (e.g. a CD drive, a DVD drive, etc.) and/or a tape drive, among others. Furthermore, hardware 400 may include an interface with one or more networks 412 (e.g., a land, a WAN, a wireless network, and/or the Internet among others) to permit the communication of information with other computers coupled to the networks. It should be appreciated that system 400 typically includes suitable analog and/or digital interfaces between processor 402 and each of the components 404, 406, 408 and 412 as is well known in the art.

Processing system 400 operates under the control of an operating system 414, and executes various computer software applications, components, programs, objects, modules, etc. (e.g. a program or module which performs operations as shown in FIG. 3 of the drawings). Moreover, various applications, components, programs, objects, etc. may also execute on one or more processors in another computer coupled to system 400 via a network 412, e.g. in a distributed computing environment, whereby the processing required to implement the functions of a computer program may be allocated to multiple computers over a network.

In general, the routines executed to implement the embodiments of the invention, may be implemented as part of an operating system or a specific application, component, program, object, module or sequence of instructions referred to as "computer programs". The computer programs typically comprise one or more instructions set at various times in various memory and storage devices in a computer, and that, when read and executed by one or more processors in a computer, cause the computer to perform these steps necessary to execute steps or elements involving the various aspects of the invention. Moreover, while the invention has been described in the context of fully functioning computers and computer systems, those skilled in the art will appreciate that the various embodiments of the invention are capable of being distributed as a program product in a variety of form, and that the invention applies equally regardless of the particular type of signal bearing media used to actually off the distribution. Examples of signal bearing media include but are not limited to recordable type media such as volatile and non-volatile memory devices, floppy and other removable disks, hard disk drives, optical disks (e.g. CD ROMS, DVDs, etc.), among others, and transmission type media such as digital and analog communication links.

Although the present invention has been described with reference to specific exemplary embodiments, it will be evident that the various modification and changes can be made to these embodiments without departing from the broader spirit of the invention as set forth in the claims. Accordingly, the specification and drawings are to be regarded in an illustrative sense rather than in a restrictive sense.

What is claimed is:

1. A method for authenticating a user of a mobile device, the method comprising:
   receiving a request from a client device to access a resource on a network;
   identifying a network address of the client device;
   retrieving a mapping of the network address to user identification information and device identification information;
   determining if the mapping is valid by issuing an authentication challenge and comparing information in a response to the authentication challenge with information in the mapping; and
   preventing the request from reaching the resource if the mapping is not valid.

2. The method of claim 1, wherein retrieving the mapping comprises retrieving the mapping from a remote server.

3. The method of claim 2, wherein retrieving the mapping comprises using the RADIUS protocol to request the mapping from the remote server.

4. The method of claim 1, wherein the authentication challenge comprises a request to provide device identification information and user identification information used to obtain the network address.

5. The method of claim 1, wherein the network address is a mobile IP address.

6. A system for controlling access to a network, the system comprising a processor; and a memory coupled to the processor, the memory storing instructions which when executed by the processor cause the system to perform a method comprising:
   receiving a request from a client device to access a resource on a network;
   identifying a network address of the client device;
   retrieving a mapping of the network address to user identification information and device identification information;
   determining if the mapping is valid by issuing an authentication challenge and comparing information in a response to the authentication challenge with information in the mapping; and
   preventing the request from reaching the resource if the mapping is not valid.

7. The system of claim 6, wherein retrieving the mapping comprises receiving the mapping from a remote server.

8. The system of claim 7, wherein retrieving the mapping comprises using the RADIUS protocol to request the mapping from the remote server.

9. The system of claim 6, wherein the authentication challenge comprises a request to provide device identification information and user identification information used to obtain the network address.

10. The system of claim 6, wherein the network address is a mobile IP address.

11. A computer-readable medium having stored thereon a sequence of instructions which when executed by a processor cause the processor to perform a method comprising:
   receiving a request from a client device to access a resource on a network;
   identifying a network address of the client device;
   retrieving a mapping of the network address to user identification information and device identification information;
   determining if the mapping is valid by issuing an authentication challenge and comparing information in a response to the authentication challenge with information in the mapping; and
   preventing the request from reaching the resource if the mapping is not valid.

12. The computer-readable medium of claim 11, wherein retrieving the mapping comprises retrieving the mapping from a remote server.

13. The computer-readable medium of claim 12, wherein retrieving the mapping comprises using the RADIUS protocol to retrieve the mapping from the remote server.

14. The computer-readable medium of claim 11, wherein the authentication challenge comprises a request to provide device identification information and user identification information used to obtain the network address.

15. The computer-readable medium of claim 11, wherein the network address is a mobile IP address.

16. A system for controlling access to a network, the system comprising:
   means for receiving a request from a client device to access a resource on a network;
   means for identifying a network address of the client device;
   means for retrieving a mapping of the network address to user identification information and device identification information;
   means for determining if the mapping is valid by issuing an authentication challenge and comparing information in a response to the authentication challenge with information in the mapping; and
   means for preventing the request from reaching the resource if the mapping is not valid.

17. A method for authenticating a user of an enabled device, the method comprising:
   receiving a request from a client device to access an origin server;
   identifying a network address of the client device;
   sending an authentication challenge to the client device, wherein user identification information and device identification information is requested;
   receiving a response to the authentication challenge;
   retrieving user identification and device identification information associated with the network address of the client device from a server;
   comparing the user identification information and the device identification information received in the response with the user identification information and the device identification information retrieved from the server; and
   preventing the request from reaching the origin server if the user identification information and device identification information received in the response does not match the user identification information and the device identification information retrieved from the server.

18. The method of claim 17, wherein the server is a RADIUS accounting server.

19. The method of claim 17, wherein the network address is a mobile IP address.

* * * * *